United States Patent [19]

Carter et al.

[11] Patent Number: 5,138,658
[45] Date of Patent: Aug. 11, 1992

[54] SUBSCRIBER LINE INTERFACE CIRCUIT PROVIDING REGULATED CURRENT

[75] Inventors: Dan K. Carter, Broken Arrow; Donald W. Wortman, Bixby, both of Okla.

[73] Assignee: Seiscor Technologies Inc., Tulsa, Okla.

[21] Appl. No.: 794,818

[22] Filed: Nov. 18, 1991

Related U.S. Application Data

[63] Continuation-in-part of Ser. No. 504,513, Apr. 4, 1990, abandoned.

[51] Int. Cl.$^5$ .......................................... H04M 19/00
[52] U.S. Cl. .................................. 379/413; 379/399; 379/378; 379/402; 379/404
[58] Field of Search ............... 379/413, 399, 402, 403, 379/404, 324, 378

[56] References Cited

U.S. PATENT DOCUMENTS

| | | | |
|---|---|---|---|
| 3,617,645 | 11/1971 | Gumley | 379/402 |
| 3,671,676 | 6/1972 | Henry et al. | 379/400 |
| 3,959,718 | 5/1976 | Hasegawa | 379/378 X |
| 4,096,363 | 6/1978 | Earp | 379/399 X |
| 4,103,112 | 7/1978 | Korsky | 379/378 |
| 4,118,597 | 10/1978 | Proctor et al. | 379/378 |
| 4,241,239 | 12/1980 | Pernyeszi | 379/413 |
| 4,243,842 | 1/1981 | Gibb | 379/399 |
| 4,562,525 | 12/1985 | Ferry et al. | 379/413 X |
| 4,682,355 | 7/1987 | Bailly et al. | 379/413 X |
| 4,685,129 | 8/1987 | Gavrilovich | 379/413 X |
| 4,685,130 | 8/1987 | Burns | 379/399 X |
| 4,761,812 | 8/1988 | Hollis et al. | 379/413 |
| 4,922,531 | 5/1990 | Moisin | 379/413 |
| 4,982,426 | 1/1991 | Jakab | 379/399 X |
| 4,991,051 | 2/1991 | Hung | 379/399 X |

OTHER PUBLICATIONS

Ericsson Components AB; Kista-Stockhom, Sweden; "PBL 3739 Subscriber Line Interface Circuit"; Sep. 1988; pp. 4-17 to 4-30.
"Switching Power Supply Topology Review", L. H. Dixon, Jr.; pp. P1-1 to P1-12.
Unitrode Corporation; Lexington, MA; "Current Mode Control of Switching Power Supplies"; pp. C3-1 to C3-9.
Plessey Semiconductors, Ltd.; United Kingdom; "SL373 Subscriber Line Interface Circuit"; Nov. 1987; pp. 2-13.
"Comparative Analysis of Chopper Voltage Regulations with LC Filter"; O. Kossov; IEEE Transactions of Magnetics, vol. Mag-4, No. 4, Dec. 1968; pp. 712-715.
EDN-Electrical Design News, vol. 32, No. 9, 30th Apr. 1987, pp. 149-152, 154; C. Stacey: "Magnetic Compensation Gives New Life to Transformer-Based SLICs" * Figures A,2 *.

Primary Examiner—James L. Dwyer
Assistant Examiner—M. Shehata
Attorney, Agent, or Firm—William R. Clark; Richard M. Sharkansky

[57] ABSTRACT

A subscriber line interface circuit that provides regulated current to telephone subscribers in an improved manner reducing the amount of power required to operate while maintaining a constant current source. The current to the telephone subscribers flows through a switching transistor, an inductive storage element, sensing resistors and a transformer. The desired operating characteristic is obtained by cycling the switching transistor. The switching transistor is cycled on at a preset interval causing the telephone subscriber current to flow from the switching transistor. The switching transistor is cycled off in response to an increase in the telephone subscriber current as sensed by the sensing resistors thereby causing the current to flow from the inductive storage element.

11 Claims, 5 Drawing Sheets

SUBSCRIBER LINE INTERFACE CIRCUIT PROVIDING REGULATED CURRENT

This application is a continuation-in-part of application Ser. No. 504,513 filed Apr. 4, 1990, abandoned Nov. 18, 1991.

BACKGROUND OF THE INVENTION

The field of the invention generally relates to an apparatus for providing an interface between a central office and a telephone subscriber, and more particularly relates to reducing the power requirements for an interface circuit that provides regulated current to a telephone subscriber.

Telephone subscribers typically have a voice signal and DC power fed to them from the central office through a loop interface circuit onto a pair of wires connected to the subscriber telephone. Conductive or resistive power and the voice signal may be applied to the loop interface circuit either through a transformer or capacitor. It is becoming increasingly common to insert electronic systems between the central office and the subscriber telephone either to increase the voice travel on each pair of wires, to add or increase the data handling capability of a pair of wires, or to improve the quality of service to the subscriber in some way. Most of these electronic systems provide all the services to the subscriber telephone that the central office normally provides. These services include providing the following to the telephone subscriber: regulated direct current, voice signals, off-hook and dialing signals (either pulse or tone), and ring signals.

Providing regulated direct current to the telephone subscriber requires components between the power source and the subscriber telephone These components disrupt power and reduce the efficiency of the system. Direct current must have a minimum of 20 milliamps, and in some cases, 25 milliamps. The central office current source typically includes a battery supplying 48 volts direct current, though less voltage would be acceptable subject to the minimum current requirements.

A few methods have traditionally been used to supply direct current and the voice signal to the telephone subscriber. In a first method, a transformer is used to couple the voice signal onto a telephone line having a pair of wires connected to the telephone subscriber. In this method, a power supply having a fixed constant voltage output is coupled to the transformer and supplies direct current through the pair of wires to the telephone subscriber via this same transformer. A drawback of this method is that transformers can saturate when a large amount of current flows through transformer windings. This saturation results in distortion of the voice signal being provided to the telephone subscriber. Consequently, supplying direct current through the transformer winding requires a relatively large magnetic core to prevent the magnetic core from becoming saturated.

A further drawback of this method is that the direct current resistance of the telephone line varies with the length of the telephone line. Consequently, a power supply with a constant voltage output sufficient to supply the minimum current on a long telephone line would supply considerably higher current than necessary on a short line. Thus, to prevent the core of the transformer from saturating, the transformer would have to be two to four times larger to handle the current of the short line than if the transformer and supply were dedicated for use only on a long line. Another drawback of this method is that a larger power supply may be necessary to meet the current requirements when providing power with a short telephone line.

An improvement on this first supply method is using a power supply having a fixed constant current output instead of a fixed constant voltage output. Using a power supply with a constant current output allows a two to four times reduction in the transformer size. With a constant current output, the current through the transformer is fixed and the size of the transformer is selected accordingly. With a constant voltage output, the transformer size must be selected for worst case condition that prevents the transformer core from saturating. However, there is still a significant power loss to having a constant current output, especially on communications systems having a telephone line with a short length. In short length telephone line systems, most of the system supply voltage is dropped across the current source.

A second method of supplying DC power to the telephone subscriber has generally been used by the medium to larger electronic systems. In large systems, the total power requirements are too large to be supplied over the telephone line between the central office and the subscriber via the loop interface circuit. In these systems, commercial AC power is provided on the subscriber end to directly power battery chargers and power supplies. These batteries and power supplies directly feed power via line cards and telephone lines to the telephone subscribers. In order to reduce the physical size of the line cards, the direct current is not supplied through a voice frequency transformer on the line card, but is coupled to the telephone subscriber through two resistors, typically having about 450 ohms each. One resistor is coupled from the positive side of the power supply to the tip side of the telephone line, and the other resistor is coupled from the negative side of the power supply to the ring side of the telephone line. Coupling the power supply in series with the resistors to both the tip and ring lines balances the telephone line and rejects longitudinally induced AC currents, most notably 60 hertz currents induced from power lines extending adjacent the telephone subscriber lines. The voice signal is capacitively coupled to the telephone line to eliminate the requirement of having direct current being fed to the telephone subscriber through the transformer.

This second method reduces the transformer size requirement compared to the first method but increases the system power requirements because of the power lost due to heat generated when current is fed through the DC resistors. Further, most of the heat dissipated is due to the current fed through the DC resistors as the transformer resistance is generally less than 100 ohms. Further, as systems get larger and provide power to more subscriber lines, this heat becomes a problem. Another problem with this method is that larger batteries and chargers must be used, as the power supply must be sized for worst-case applications, i.e. when all lines short circuit.

Another method of supplying DC power is with a current source connected directly to the telephone line with the voice signal on it. This method requires two current sources: one coupled to the tip line and one coupled to the ring line to maintain longitudinal balance. When two current sources are used in this way, each must supply the identical current to keep the other current source from saturating. When a current source saturates, it will essentially short one side of the telephone line. Most likely, a feedback method would have to be employed with this method to maintain the line voltage centered between the power supply voltage. This method has a drawback of requiring elaborate circuitry to protect the solid state devices that would be used to implement this feedback because these devices are connected directly to the subscriber telephone line and are susceptible to transient signals on this line, i.e. lightning.

In the last few years, integrated circuit manufacturers have offered line interface integrated circuits which have two current sources and the necessary balance feedback. One current source is coupled to the tip line and the other current source is coupled to the ring line. However, these integrated circuits have the drawback of requiring a large voltage drop across each of the current sources to prevent saturation caused by peak voice signal levels on tip and ring. Saturation of the current source may result in the voice signals being clipped. Further, requiring a large voltage drop requires a larger power supply.

These integrated circuits also have the drawback of requiring circuitry to provide transient protection, as these integrated circuits can withstand peak voltages only on the order of 70 volts. Consequently, these integrated circuits may not be practical in systems where the subscriber telephone line is exposed to lightning and AC power system transients.

BRIEF DESCRIPTION OF THE DRAWINGS

The foregoing objects and advantages will be more fully understood by reading the Description of the Preferred Embodiments with reference to the drawings wherein.

SUMMARY OF THE INVENTION

Figure 1:
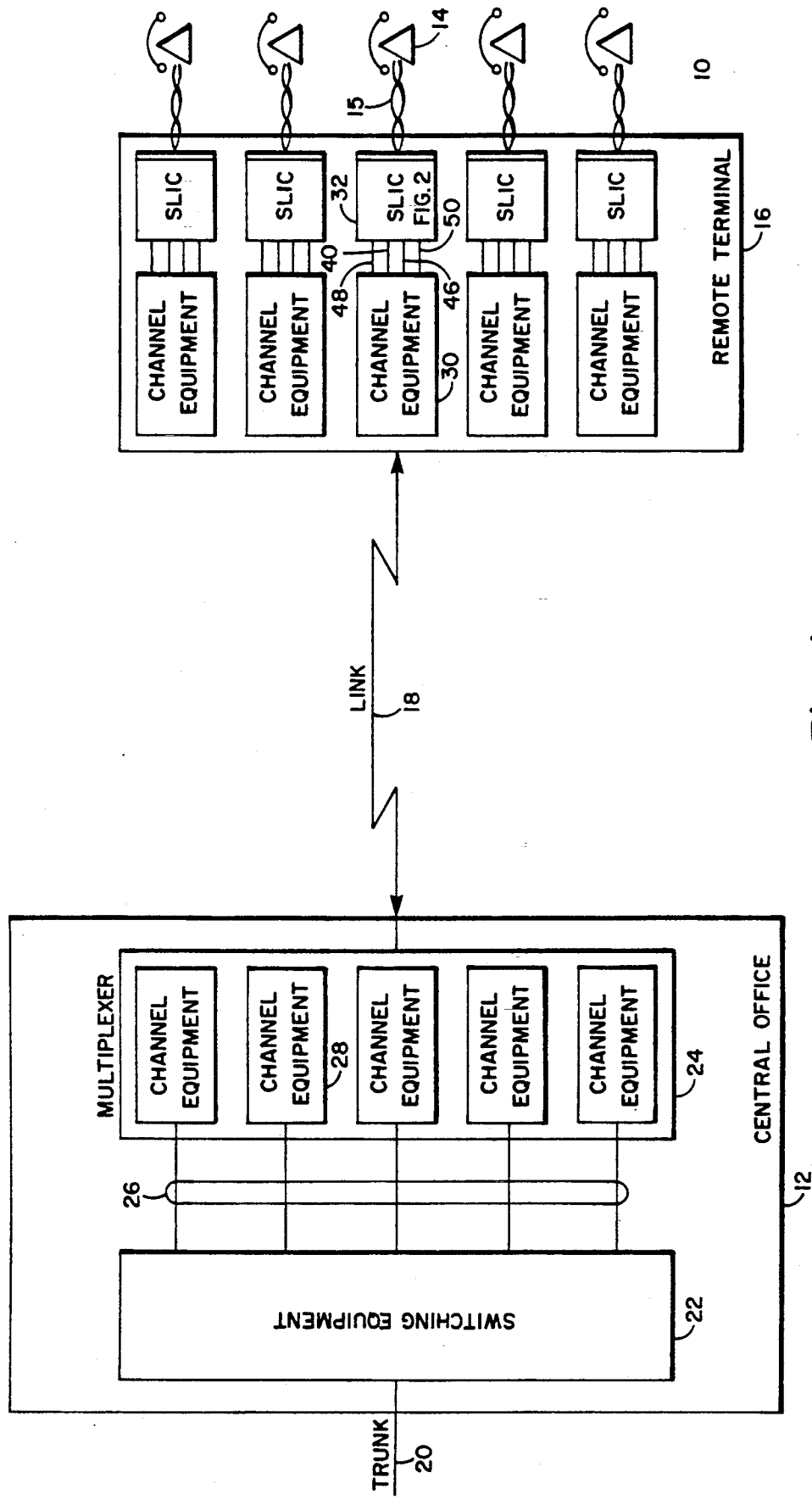
FIG. 1 shows a block diagram of the system enabling the invention.

An object of this invention is to provide an improved subscriber interface circuit.

Another object of the invention is to provide a subscriber interface circuit that has reduced power.

It is also an object of the invention to provide a subscriber interface circuit that senses the current to the subscriber and reduces its power in accordance with the sensed current.

A further object of the invention is to provide an interface circuit that senses the current being provided to a telephone subscriber and is immune to current on the subscriber line caused by power line induction.

It is another object of the invention to provide a subscriber interface circuit that couples voice signals from a central office to the subscriber with reduced board space.

It is an additional object of the invention to provide a subscriber interface circuit that couples voice signals to the subscriber using a transformer and cancels flux developing within the core of the transformer.

Also, it is an object of this invention to sense the current being provided to a telephone subscriber and regulating the current being provided in accordance with the current sensed, while compensating for any induced current that is coupled to the tip or ring line.

These and other objects are provided with an apparatus for providing power to a telephone subscriber comprising a transformer coupled to the subscriber, wherein the transformer has a core. A source means for providing a drop current to the telephone subscriber through the transformer is also provided, wherein the drop current from the source means produces flux with a polarity in the transformer core. The telephone subscriber also comprises means for sensing the drop current and means responsive to the sensing means for cancelling the flux in the transformer core to prevent the transformer from saturating when a short line is coupled between the transformer and the telephone subscriber. Further, the sensor reduces the power requirements necessary to meet the systems current requirements when power is provided through the transformer to a short telephone line.

Alternately, an apparatus for providing power to a telephone subscriber is provided comprising a power source that provides a drop current to the telephone subscriber, and means for sensing the drop current. The apparatus further includes switch means coupled to the power source having means for switching the drop current off when the sensing means senses a predetermined amount of drop current, means for storing the drop current when the drop current is provided, and means for feeding the stored drop current to the telephone subscriber when the drop current is switched off. This switch means provides regulated current to the telephone subscriber with an improved power efficiency.

It may be preferable that the apparatus further comprise means for providing a ring signal to the subscriber, and means responsive to the ring signal for changing the predetermined amount of drop current at which the switching means switches the drop current off to prevent premature ring trip during the ring cycle while still detecting an off-hook telephone subscriber condition. It may be preferable that the current be provided to the telephone subscriber over a first and second telephone line, wherein current is sourced to the subscriber over the first telephone line and wherein the current is sunk from the subscriber over the second telephone line. It may further be preferable that the sensing means senses the current being sourced and the current being sunk to compensate for current developing on the telephone line caused by power line inductance.

DESCRIPTION OF THE PREFERRED EMBODIMENTS

Referring to FIG. 1, there is shown a telephony system 10 having a central office 12 coupled to telephone subscriber 14 through remote terminal 16. A central office may also include a PBX, local switch, etc. The central office 12 and remote terminal 16 are connected together with link 18. Central office 12 is coupled to central offices (not shown) within other telephony systems via trunk line 20.

Central office 12 comprises switching equipment 22 coupled to multiplexer 24 through independent channel lines 26. Switching equipment 22 routes signals from trunk line 20 to channel line 26; routes signals from channel lines 26 to trunk line 20; and routes signals from channel lines 26 to other channel lines 26.

Multiplexer 24 contains channel equipment 28. Multiplexer 24 multiplexes signals applied to channel lines 26 and feeds the multiplexed signal onto link 18. Multiplexer 24 demultiplexes signals applied to link 18 and feeds the demultiplexed signals through respective channel lines 26 to switching equipment 22. Link 18 may be a wire, optical fiber, microwave transmission, etc.

Remote terminal 16 comprises a plurality of channel equipment 30. Remote terminal 16 demultiplexes signals applied to link 18 and then feeds the demultiplexed signal through channel equipment 30, telephone lines 15 to telephone subscribers 14. Remote terminal 16 multiplexes the signals from telephone subscribers 14 via channel equipment 30, and then feeds the multiplexed signal onto link 18.

Figure 2:
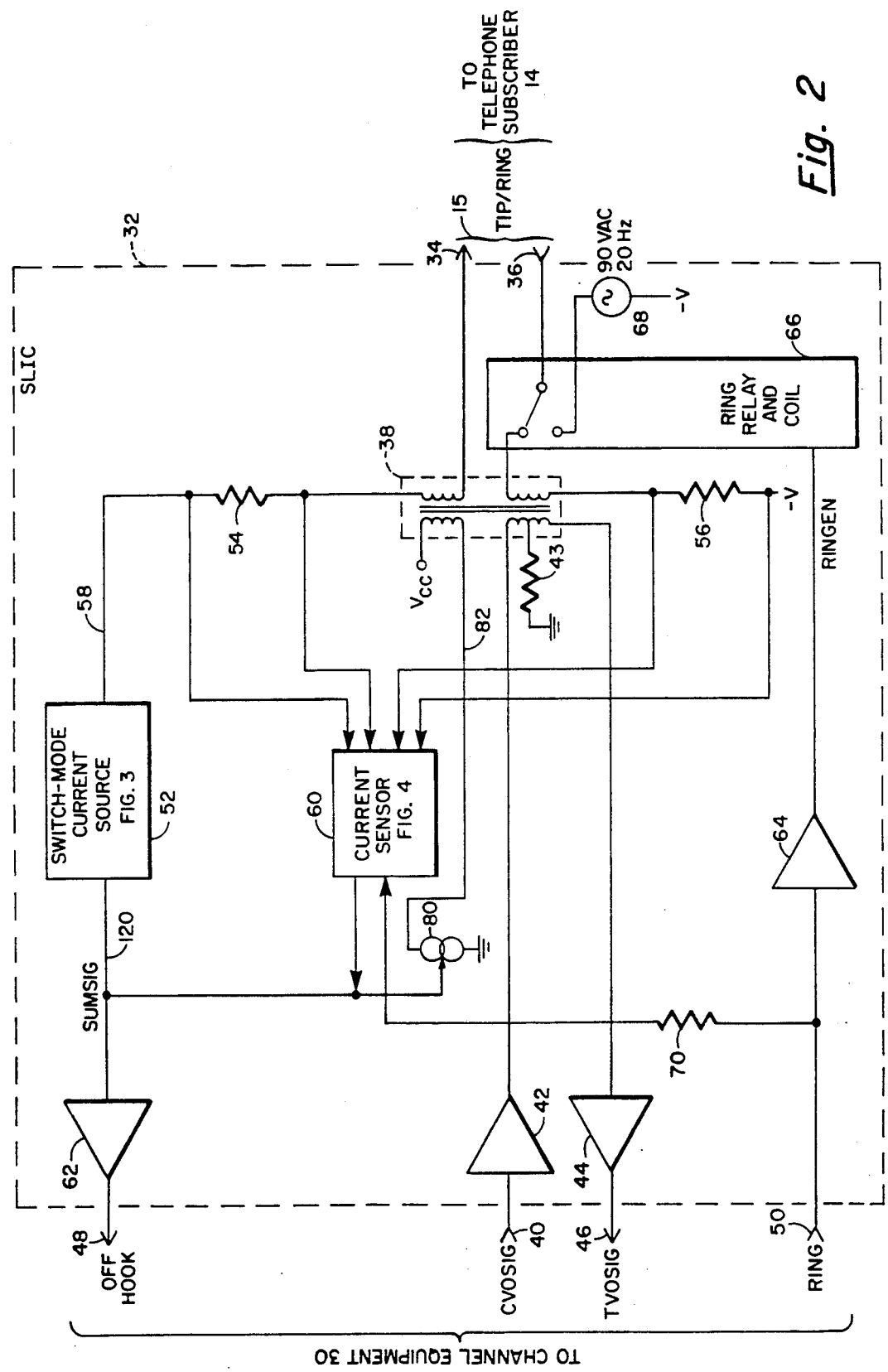
FIG. 2 shows a block diagram of the subscriber interface circuit.

Each channel equipment 30 is coupled to a subscriber loop interface circuit (SLIC) 32 through terminals 48, 40, 46, and 50. A SLIC 32 receives operating current, ring signals RING and voice signals CVOSIG via receive terminal 50 and 40, respectively, from channel equipment 30. SLIC 32 provides RING, CVOSIG, and current to telephone subscribers 14 via tip and ring terminal 34 and 36, as shown in FIG. 2. Channel equipment 30 receives voice signals TVOSIG via terminal 46, and on-hook/off-hook control signal OFFHOOK via terminal 48 from SLIC 32. This current being provided to the telephone subscribers will be referred to as drop current. SLIC 32 also provides OFFHOOK to channel equipment 30.

Referring to FIG. 2, there is shown a SLIC 32. SLIC 32 is coupled to telephone subscriber 14 via tip terminal 34 and ring terminal 36. SLIC 32 is coupled to channel equipment 30 through receive terminal 40, transmit terminal 46, off-hook terminal 48, and ring enable terminal 50. Power $V_{cc}$, $-V_{EE}$, $-V$, and GND are provided to SLIC 32 by conventional means, preferably having voltages levels of $+5V$, $-12V$, $-48V$ and $0V$, respectively.

SLIC 32 receives TVOSIG from telephone subscribers 14 on tip terminal 34 and ring terminal 36. TVOSIG is passed from the tip and ring terminals 34 and 36 to hybrid transformer 38. SLIC 32 receives CVOSIG from channel equipment 30 on receive terminal 40. The CVOSIG is amplified by receive amplifier 42 and then passed to hybrid transformer 38.

Hybrid transformer 38 with resistor 43 separates the CVOSIG and TVOSIG fed from receive amplifier 42, and from tip and ring terminals 34 and 36. The TVOSIG is applied from hybrid transformer 38 to a transmit amplifier 44. Transmit amplifier 44 amplifies the TVOSIG and then applies the amplified TVOSIG through transmit terminal 46 to channel equipment 30. The CVOSIG is applied from hybrid transformer 38 through tip and ring terminal 34 and 36 to telephone subscriber 14.

The telephone subscriber 14 is powered by the switch mode current source 52 applying a drop current through output line 58, resistor 54, hybrid transformer 38 to tip terminal 34. Further, SLIC 32 sinks drop current applied to ring terminal 36 through hybrid transformer 38, and resistor 56. More details of current source 52 will be explained later in connection with FIG. 3. The drop current to telephone subscriber 14 is regulated by a negative feedback control loop comprising current source 52, resistors 54 and 56, and current sensor 60. Current sensor 60 sums the voltage drop across resistors 54 and 56 and then applies a summing signal SUMSIG on output 120 to current source 52 proportional to the sum of the voltage drop across each respective resistor 54 and 56. Current source 52 responds to SUMSIG from current sensor 60 by increasing or decreasing drop current on output line 58.

When the current increases through resistors 54 and 56, SUMSIG voltage level increases, resulting in current source 52 limiting its output drop current. When the current decreases through resistors 54 and 56, SUMSIG voltage level decreases, resulting in current source 52 no longer limiting its drop current.

Current sensor 60 is coupled through off-hook detect amplifier 62 to off-hook terminal 48. Current sensor 60 detects current through resistor 54 and resistor 56. Current sensor 60 applies SUMSIG to off-hook detect amplifier 62 having an amplitude proportional to the current detected through resistors 54 and 56. When SUMSIG amplitude reaches a preset voltage level, detect amplifier 62 provides OFFHOOK to off-hook terminal 48 indicating that subscriber terminal 14 is off-hook. Off-hook detect amplifier 62 provides an off-hook detection margin by containing a bias network that insures that SUMSIG reach a preset or reference (REF) voltage level before providing the OFFHOOK to off-hook terminal 48.

SUMSIG from the output 120 of current sensor 60 is also coupled to current source 80. Current source 80 has an output 82 that is coupled through hybrid transformer 38 to $V_{cc}$. Current sensor 60 applies SUMSIG to current source 80. Current source 80 responds to SUMSIG by sourcing current from $V_{cc}$ through hybrid transformer 38 to current source 80. The amount of current sourced has a magnitude proportional to the amplitude of SUMSIG's voltage level. The current is sourced to cause flux in hybrid transformer 38 having a polarity opposite from the flux caused by the drop current. Thus, the flux through hybrid transformer 38 caused by the drop current is cancelled. Further, as the current source 80 responds to changes in the drop current by changing the current on output 82, core flux remains cancelled with changing drop current. Accordingly, a smaller transformer may be used.

Ring enable terminal 50 is coupled through ring relay driver 64 to ring relay and coil 66. Ring relay 66 is coupled to hybrid transformer 38 and ring generator 68. Ring generator 68 provides a 90 V alternating current having a 20 Hertz signal through ring relay 66, terminal 36 to telephone subscriber 14. The subscriber channel equipment 30 feeds RING to ring relay driver 64 via ring enable terminal 50. Ring relay driver 64 amplifies RING and then applies the amplified RING or ring enable signal RINGEN to ring relay 66. Normally, ring relay 66 couples hybrid transformer 38 to terminal 36. However, ring relay 66 responds to RINGEN by connecting the telephone subscriber 14 to ring generator 68 to ring the bell on the telephone subscriber 14.

Ring enable terminal 50 is also coupled through resistor 70 to current sensor 60. When RING is applied through ring enable terminal 50 and resistor 70 to current sensor 60, current sensor 60 decreases its off-hook sensitivity. Accordingly, during a ringing cycle, the sensitivity of current sensor 60 is changed in response to RING to prevent SUMSIG from prematurely trigging an OFFHOOK signal. Further, current sensor 60 remains sensitive to the drop current to allow immediate sensing of when telephone subscriber 14 is off-hook during either the ringing cycle or the on-hook (not ringing) cycle.

Figure 3:
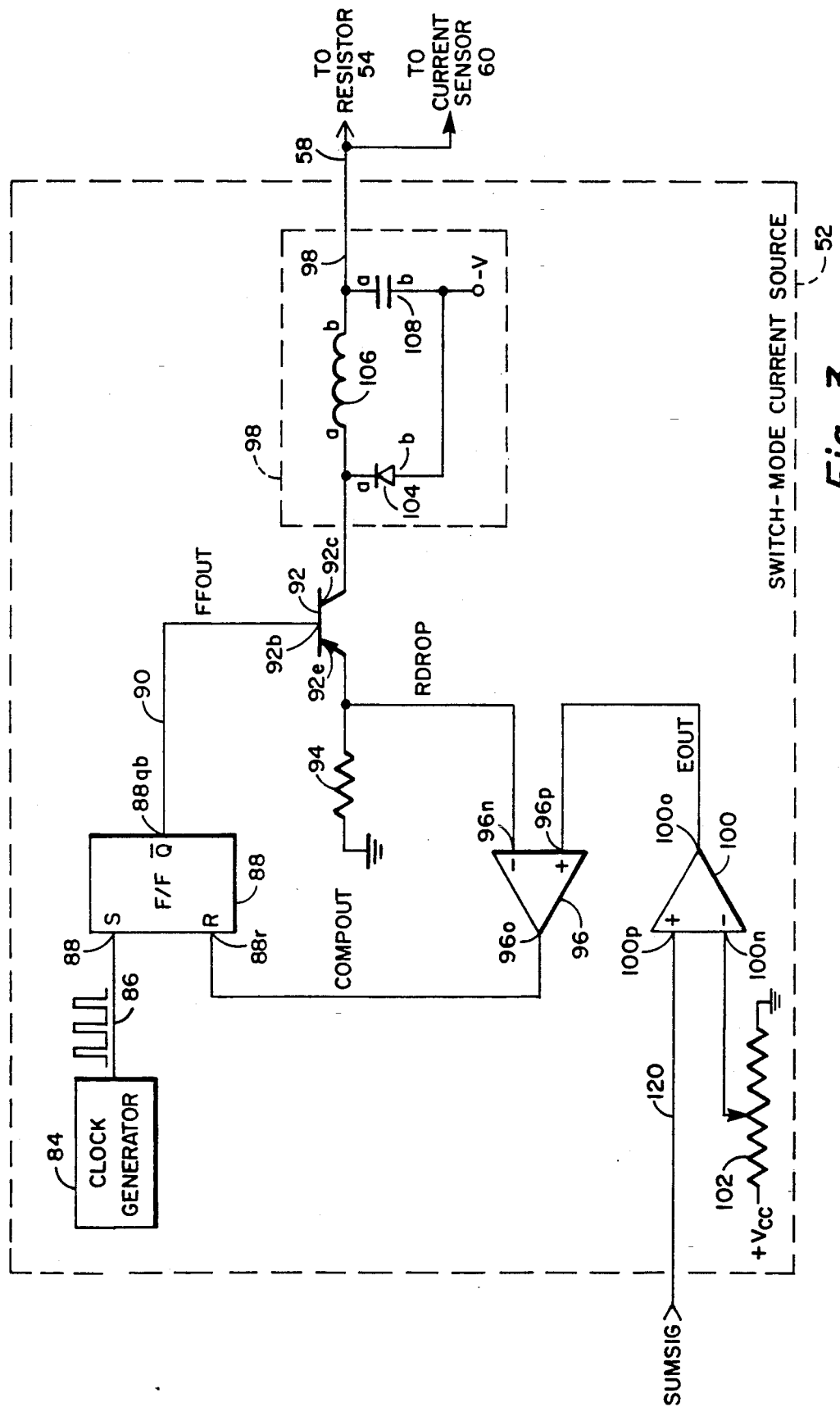
FIG. 3 shows a schematic diagram of the switch mode current source shown in FIG. 2.

Referring to FIG. 3, there is shown switch mode current source 52 having a clock generator 84 providing a CLOCK signal having a series of pulses with a peak voltage of $V_{cc}$ through line 86 to set terminal 88s of flip/flop 88. These pulses preferably have a frequency of 10,000–50,000 hertz and have a pulse width of less than 500 ns (see FIG. 5). Flip/flop 88 responds to the CLOCK signal by feeding a FFOUT signal having a voltage level of $-V_{EE}$ onto output 90. Output terminal 88qb is coupled through output 90 to a base terminal 92b of p-n-p transistor 92.

The emitter terminal 92e of transistor 92 is coupled through resistor 94 to ground and to a negative input terminal 96n on comparator 96. The collector terminal 92c of transistor 92 is coupled to storage element 98. Transistor 92 responds to FFOUT having $-V_{EE}$ voltage level by conducting supply current between collector terminal 92c and emitter terminal 92e.

Comparator 96 has a negative input terminal 96n, a positive input terminal 96p, and an output terminal 96o. The positive input terminal 96p is coupled to output terminal 100o of error amplifier 100. Output terminal 96o is coupled to reset terminal 88r. Comparator 96 compares the voltage level of EOUT from output terminal of error amplifier 100 (positive input terminal 96p) with the voltage level of RDROP across resistor 94 (negative input terminal 96n). When the voltage level on positive input terminal 96p (EOUT) is greater than the voltage level of RDROP, comparator 96 feeds a COMPOUT signal having a positive voltage level $+V_{cc}$ to output terminal 96o. When the voltage level of EOUT on positive input terminal 96p is less than the voltage level of RDROP, comparator 96 feeds a COMPOUT signal having a ground voltage level onto output terminal 96o.

Error amplifier 100 includes an output terminal 100o, a positive input terminal 100p, and a negative input terminal 100n. The negative input terminal 100n is coupled to adjustable bias resistor 102 that is coupled to $+V_{cc}$ and ground. The positive input terminal 100p is coupled through output 120 to current sensor 60 and is fed SUMSIG.

Bias resistor 102 sets the maximum level of the drop current that flows to telephone subscriber 14. The maximum drop current level is reached when the voltage level of SUMSIG on positive input terminal 100p, equals the bias voltage level of negative input terminal 100n. Negative input terminal 100n is biased by bias resistor 102 at a positive voltage level relative to positive input terminal 100p. Therefore, the output signal EOUT from error amplifier 100 remains at a negative voltage level until the voltage level of SUMSIG rises to the voltage level on negative input terminal 100n. When the voltage level of SUMSIG increases, i.e. when the telephone subscriber 14 goes off-hook, EOUT voltage level moves in a positive direction. When the voltage level of SUMSIG decreases, i.e. when the telephone subscriber 14 goes on-hook, the voltage level of EOUT goes more negative.

A COMPOUT signal having a positive voltage level resets flip/flop 88, resulting in a FFOUT signal being fed on output 90 that turns transistor 92 off.

Energy storage element 98 includes a diode 104 having a cathode terminal 104a coupled to the junction of inductor terminal 106a and collector terminal 92c. Inductor terminal 106b is coupled to capacitor terminal 108a and resistor 54 (see FIG. 2). Anode terminals 104c of diode 104 and capacitor terminal 108b are coupled to $-V$. When transistor 92 is turned on, supply current flows through resistor 94, transistor 92, charging inductor 106 and capacitor 108 as well as providing drop current to telephone subscriber 14. When transistor 92 is turned off, the voltage across inductor 106 then changes its polarity, forward biasing diode 104 and maintaing drop current flow to telephone subscriber 14 by discharging stored energy within storage element 98.

Figure 4:
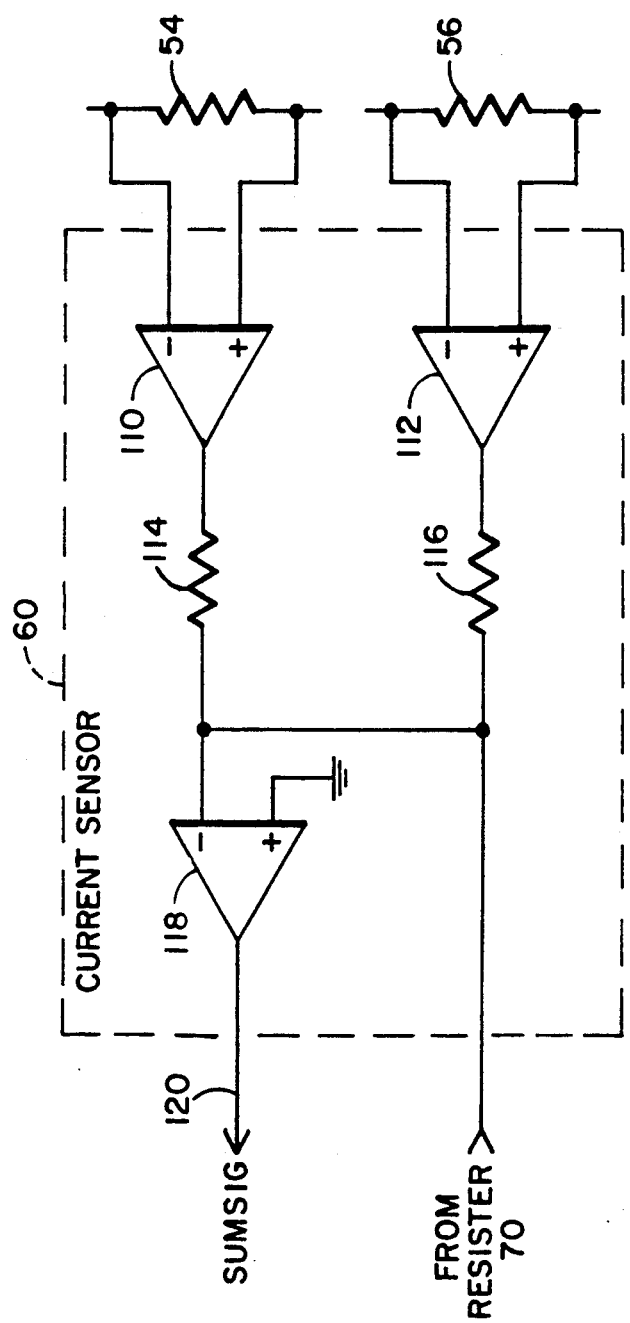
FIG. 4 shows a schematic diagram of the current sensor shown in FIG. 2.

Referring to FIG. 4, there is shown the current sensor 60 schematic diagram. Current sensor 60 includes current sense amplifiers 110 and 112 which sense the differential voltage across resistors 54 and 56, respectively, and convert these non-ground referenced voltages to currents, each having a magnitude proportional to their differential voltages. Current sense amplifiers 110 and 112 are coupled through resistors 114 and 116, respectively, to summing amplifier 118. Current sense amplifiers 110 and 112 each feed a current through resistors 114 and 116, respectively, which are added and then applied to the input of summing amplifier 118. Summing amplifier 118 provides a SUMSIG on output 120 having a voltage proportional to the drop current being fed to the telephone subscriber 14 via tip terminal 34 and ring terminal 36.

The voltage level of SUMSIG controls current source 80. Current source 80 responds to voltage level of SUMSIG by sourcing current from hybrid transformer 38 on line 82 having a magnitude of current such that the induced flux in hybrid transformer 38 is equal to the flux generated by the drop current fed to the telephone subscriber 14. The polarity of the windings within hybrid transformer 38 is such that the flux generated by drop current provided to telephone subscriber 14 and flux generated by current provided by current source 80 cancel. Thus, there is no direct current magnetic field in hybrid transformer 38. Further, the flux is constantly eliminated as the AC component of current on output 82 from hybrid transformer 38 fluctuates with the AC component of current through hybrid transformer 38 to telephone subscriber 14. Accordingly, a large transformer is not required to prevent transformer flux saturation and a small transformer may be used in hybrid transformer 38. Further, because the drop current is sensed at both tip terminal 34 and ring terminal 36, the modulation of the drop current due to longitudinal noise, such as AC power line inductance, is eliminated.

Figure 5:
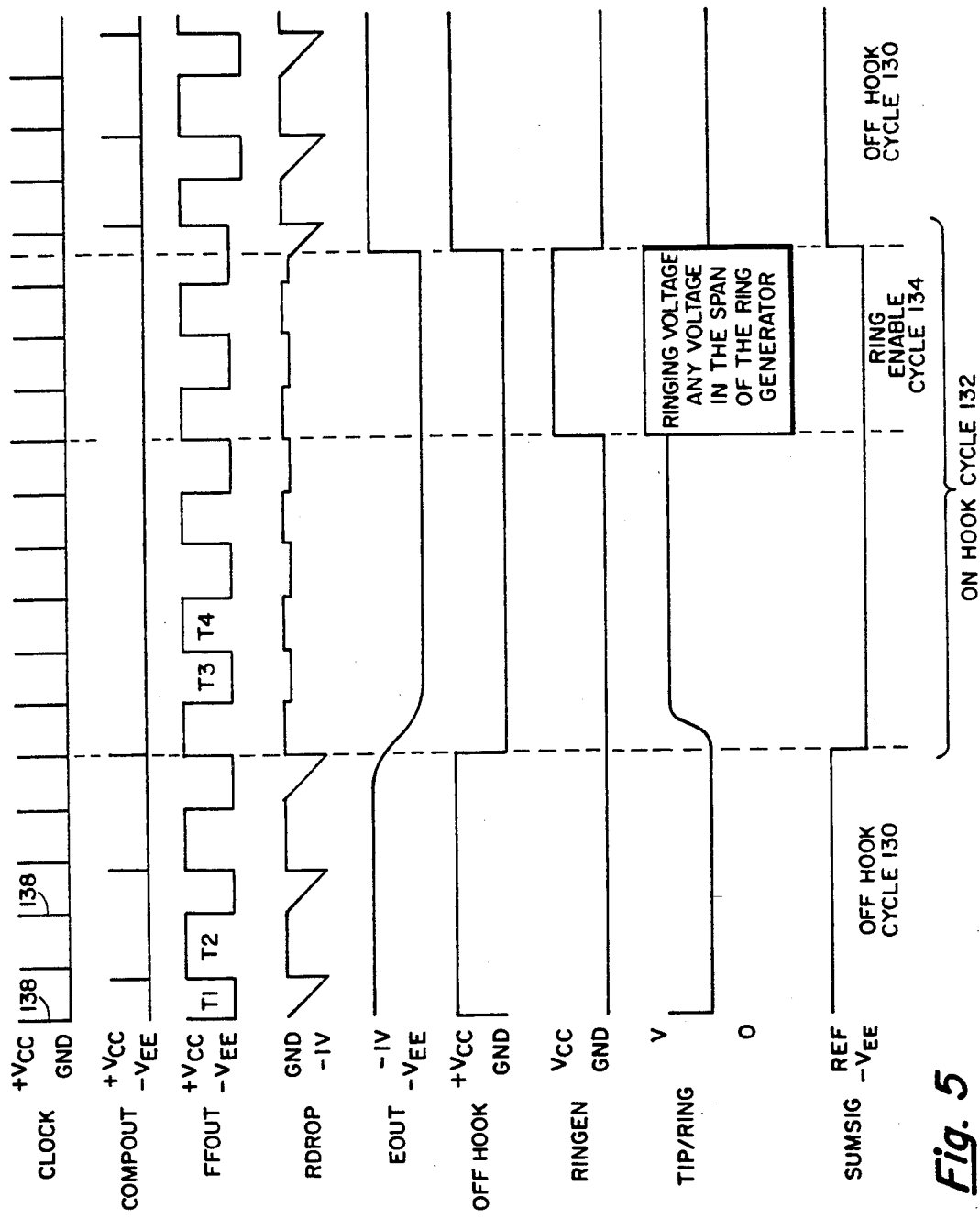
FIG. 5 shows a timing diagram of the operation of the invention.

Referring to FIG. 5, there is shown a timing diagram for the operation of the subscriber loop interface circuit 32 during an off-hook cycle 130, an on-hook cycle 132 and a ring enable cycle 134 which is a sub-cycle of the on-hook cycle. In the off-hook cycle 130, the telephone subscriber 14 is off-hook; in the on-hook cycle 132, the telephone subscriber 14 is on-hook; and during the ring enable cycle 134, the telephone subscriber 14 is on-hook and a bell (not shown) within the telephone subscriber 14 is ringing.

Referring to FIGS. 3 and 5, clock generator 84 (FIG. 3) provides CLOCK having a continuous stream of repeating narrow pulses 138 on line 86 to flip/flop 88. In off-hook cycle 130 and on-hook cycle 132, before pulse 138 occurs, reset terminal 88r (amplifier output 96o) is at a ground voltage level. Thus, when flip/flop 88 receives a CLOCK pulse 138 from clock generator 84 FFOUT signal on output 90 drops to $-V_{EE}$ for a time T1 during the off-hook cycle 130, and for a time T3 during the on-hook cycle 132. Time period T1 is the start of the off-hook cycle, and time period T3 is the start of the on-hook cycle. While FFOUT remains low, transistor 92 is turned on.

When transistor 92 is on, supply current flows across transistor 92, through storage element 98, charging inductor 106 and capacitor 108. Drop current is then supplied to telephone subscriber 14. The voltage level across resistor 94 RDROP is fed to negative input terminal 96n. The RDROP drops toward $-V$ when the transistor 92 is turned on.

Referring to FIG. 2, the output 58 is fed through resistor 54 and hybrid transformer 38 to telephone subscriber 14. Further, the drop current from telephone subscriber 14 is fed through ring relay 66, hybrid transformer 38, resistor 56 to $-V$. Referring to FIG. 4, the differential voltage across resistors 54 and 56 is sensed by current sense amplifiers 110 and 112 and then fed to summing amplifier 118. Referring to FIG. 5, as drop current increases (not shown), a SUMSIG's voltage level increases proportionally to a positive voltage level and is then fed to positive input terminal 100p. Referring to FIGS. 3 and 5, positive input terminal 100p is biased at a more negative voltage level relative to negative input terminal 100n so that during the off-hook cycle 130 and on-hook cycle 132, EOUT remains at a negative voltage level.

Comparator 96 compares EOUT to RDROP. During the off-hook cycle, when the voltage level across resistor 94 (RDROP) decreases, i.e., the voltage level on negative input terminal 96n (EOUT), drops to below the voltage level of positive input terminal 96p, the comparator output terminal 96o feeds COMPOUT signal having a narrow pulse to reset terminal 88r, resulting in flip/flop 88 being reset.

During an on-hook cycle, much less drop current is required by the telephone subscriber than during an off-hook cycle. Therefore, during an on-hook cycle, the voltage at RDROP will new fall below EOUT. COMPOUT will always remain at ground level and will not reset flip/flop 88. However, the next CLOCK pulse (after the CLOCK pulse which set flip/flop 88) will reset flip/flop 88. The result is that during an on-hook cycle, FFOUT will have a duty cycle (time during which transistor 92 is on) of 50%. Thus, as shown in FIG. 5 during on-hook cycle 132, FFOUT is at $=V_{EE}$ for one period of CLOCK.. That is, the duration of T3 is equal to the duration of T4, or one period of CLOCK. During the off-hook cycle, the maximum duty cycle of FFOUT is 50%. That is, T1 can be less than or equal to T2, but T1 cannot be greater than T2. If the voltage at RDROP does not fall below EOUT before the next clock pulse occurs, flip/flop 88 will be reset, even if COMPOUT is still at ground level. For proper operation during an off-hook cycle, the feedback circuit which regulates the amount of drop current output from switch mode current source 52 must be designed so that RDROP becomes less than EOUT in a time period which is of less duration than the time period between successive clock pulses.

When flip/flop 88 is reset, FFOUT remains high for a time period T2 during the off-hook cycle and a time period T4 during the on-hook cycle. While FFOUT remains high, transistor 92 is turned off. The voltage level across resistor 94 RDROP next increases to a ground level that is fed to comparator negative input terminal 96n. Comparator 96 responds to the ground level of RDROP by removing the pulse from COMPOUT. FFOUT remains at a high voltage level until another clock pulse 138 in the CLOCK signal is provided from clock generator 84. When CLOCK provides another pulse 138, flip/flop is set and the cycle begins again. It is recognized that the greater the drop current, the faster COMPOUT is fed to reset terminal 88r to turn off transistor 92, thereby limiting the drop current.

OFFHOOK signal is shown in FIG. 5. OFFHOOK is active ($+V_{cc}$) when SUMSIG voltage level exceeds a predetermined threshold. When the telephone subscriber 14 is on line, the OFFHOOK signal is active. This threshold is changed during the ring enable cycle 134 when RING is fed to the input of summing amplifier 118. Summing amplifier 118 responds to the RING by increasing the current required to make SUMSIG voltage level exceed the above-mentioned threshold.

The voltage level of TIP/RING is at a level during the off-hook cycle 130 determined by the drop current, and the resistance of both telephone subscriber 14 and the telephone line 15 connecting the telephone subscriber 14 to SLIC 32. The voltage level of TIP/RING approaches V during non-ring enable portion of on-hook cycle 132.

Referring to FIGS. 2 and 5, during ring enable cycle 134, a RING signal having a positive voltage level is applied through ring relay driver 64 resulting in RINGEN, having a positive voltage level, being applied to ring relay 66. Ring relay 66 responds to RINGEN by disconnecting the ring terminal 36 from hybrid transformer 38 and connecting ring terminal 36 to ring generator 68 which is biased at a negative voltage, typically $-V$. The voltage level of TIP/RING varies during ring enable cycle 134 typically 90 V RMS around bias voltage V at a 20 Hz frequency rate. Ring current then flows out of the current source 52 through current sense resistor 54, hybrid transformer 38, ring relay 66, through the telephone line 15, and telephone bell (not shown) within telephone subscriber 14, and then back through telephone line 15 ring generator 68 to $-V$.

Referring to FIGS. 2, 4, and 5, ring current can be 100 ma peak which exceeds the threshold that will cause current sensor 60 to enable OFFHOOK. This is not desired unless the telephone subscriber 14 actually picks up the handset. Therefore, during the ring enable cycle 134, a correction current is fed into summing amplifier 118 through resistor 70. This correction current is of the opposite polarity to the current input from the current sense amplifier 110. As no ringing or DC current can flow through current sense resistor 56, the output of current sense amplifier 112 remains at ground. The value of resistor 70 is selected such that current sensor 60 ignores the higher current induced by ring generator 68. However, resistor 70 is also selected so that current sensor 60 detects the much higher current outputs on line 15 when the telephone subscriber 14 is taken off-hook and then current sensor 60 feeds a SUMSIG signal to detect amplifier 62 to enable OFFHOOK.

This concludes the Description of the Preferred Embodiments. A reading of those skilled in the art will bring to mind many modifications and alternatives without departing from the spirit and scope of the invention. Accordingly, it is intended that the invention only be limited by the following claims.

What is claimed is:

1. Apparatus for providing drop current to a telephone subscriber, comprising:

switch means for providing a supply current in a first state and for removing said supply current in a second state;

means for storing a portion of said supply current and providing the remaining portion of said supply current to said telephone subscriber as drop current when said switch means is in said first state and for providing said stored supply current to said telephone subscriber when said switch means is in said second state; and means for sensing said drop current and for putting said switch means in said second state in response to said drop current being above a predetermined amount.

2. The apparatus as recited in claim 1 further comprising:

a transformer means coupled between said sensing means and said telephone subscriber for coupling said drop current to said telephone subscriber, and for coupling a voice signal to said telephone subscriber, said transformer means comprising a transformer core in which said drop current produces a first flux having a first polarity.

3. Apparatus as recited in claim 2 further comprising:

means responsive to said sensing means for canceling said first flux within said transformer core, said canceling means comprising means for generating a second flux within said transformer core of said transformer means, said second flux having a second polarity which is the opposite of the first polarity.

4. The apparatus as recited in claim 1 further comprising:

means for providing a ring signal to said telephone subscriber; and means responsive to said ring signal for changing said predetermined amount of drop current at which said sensing means puts said switch means into said second state.

5. Apparatus for providing drop current to a telephone subscriber, comprising:

a source of supply current;

means for switching said supply current on and off;

means for storing a portion of said supply current and providing the remaining portion as said drop current to said subscriber when said supply current is switched on and for providing said stored supply current as said drop current to said subscriber when said supply current is switched off;

means for sensing said drop current; and said switching means comprising means responsive to said sensing means for switching said supply current off when said drop current is above a predetermined amount.

6. The apparatus as recited in claim 5 further comprising:

means for sinking said drop current from said telephone subscriber.

7. The apparatus as recited in claim 6 wherein said sensing means senses the drop current being sunk from said telephone subscriber.

8. The apparatus as recited in claim 5 further comprising:

a transformer means coupled between said sensing means and said telephone subscriber for coupling a received voice signal to said telephone subscriber.

9. A circuit for coupling a central office to a telephone subscriber comprising:

a first and second terminal in electrical contact with said telephone subscriber;

means for receiving voice information from said central office;

means, connected to said first terminal, for coupling said received voice information to said telephone subscriber;

power supply having a first supply terminal said second supply terminal providing supply current, with said second terminal coupled to said second supply terminal;

means for generating a stream of pulses;

means connected to said first supply terminal for enabling current to flow from said first supply terminal when a pulse is generated;

storage means coupled to said enabling means for storing a portion of said supply current flowing from said first supply terminal and providing the remainder of said supply current to said first terminal when said supply current is enabled;

means for sensing current flowing from said storing and providing means to said first terminal and from said second terminal to said second supply terminal;

means for disabling said supply current flowing from said first supply terminal when the sum of the currents sensed by said sensing means reaches a predetermined threshold and when said supply current flowing from said first supply terminal is enabled; and means for providing said stored portion of said supply current from said storage and providing means to said first terminal when said supply current flowing from said first supply terminal is disabled.

10. The circuit as recited in claim 9 wherein said coupling means includes a transformer connected between said storage means and said first terminal.

11. The circuit as recited in claim 10 further comprising means for providing a current through said transformer having an amount equal to a portion of said sum of the currents sensed by said sensing means to cancel flux in said transformer.

* * * * *